(12) United States Patent
Sankar Narayanan et al.

(10) Patent No.: US 12,535,164 B2
(45) Date of Patent: Jan. 27, 2026

(54) QUICK CONNECTOR WITH VERIFICATION

(71) Applicant: A. RAYMOND ET CIE, Grenoble (FR)

(72) Inventors: Jai Viknesh Sankar Narayanan, Clinton Township, MI (US); Nicolas Scordialo, Pontcharra (FR); Musa Alican Dönmez, Izmit (TR); Serhat Erol, Istanbul (TR)

(73) Assignee: A. RAYMOND ET CIE, Grenoble (FR)

( * ) Notice: Subject to any disclaimer, the term of this patent is extended or adjusted under 35 U.S.C. 154(b) by 0 days.

(21) Appl. No.: 18/840,643

(22) PCT Filed: Feb. 23, 2023

(86) PCT No.: PCT/IB2023/051683
§ 371 (c)(1),
(2) Date: Aug. 22, 2024

(87) PCT Pub. No.: WO2023/161849
PCT Pub. Date: Aug. 31, 2023

(65) Prior Publication Data
US 2025/0164051 A1    May 22, 2025

Related U.S. Application Data

(60) Provisional application No. 63/312,984, filed on Feb. 23, 2022.

(51) Int. Cl.
*F16L 37/12* (2006.01)
*F16L 37/088* (2006.01)
*F16L 37/14* (2006.01)

(52) U.S. Cl.
CPC ....... *F16L 37/1225* (2013.01); *F16L 37/0885* (2019.08); *F16L 37/144* (2013.01); *F16L 2201/10* (2013.01)

(58) Field of Classification Search
CPC ..... F16L 37/144; F16L 2201/10; F16L 37/14; F16L 37/0885; F16L 37/1225; F16L 37/0841; F16L 37/0985
See application file for complete search history.

(56) References Cited

U.S. PATENT DOCUMENTS

| 12,163,609 B2 * | 12/2024 | Baldreich ........... F16L 37/0885 |
| 2018/0283589 A1 | 10/2018 | Olofsson et al. |

(Continued)

FOREIGN PATENT DOCUMENTS

| CN | 111928028 A | 11/2020 |
| CN | 215371473 U | 12/2021 |

OTHER PUBLICATIONS

International Search Report and Written Opinion of the International Searching Authority for PCT/IB2023/051683, dated May 26, 2023 (16 pages).

*Primary Examiner* — William S. Choi
(74) *Attorney, Agent, or Firm* — WARNER NORCROSS + JUDD LLP

(57) ABSTRACT

An improved quick connector includes a connector body, a connector head, a verification tab, and a locking clip. The connector body can be coupled to the connector head at multiple rotational orientations, and the connector head includes a retainer ring integrally formed therein. The connector head further includes an axial slot for the verification tab and includes first and second tangential slots for the locking clip. Upon insertion of a male fitting in the connector head, the verification tab is slideably displaced from a concealed position to a visible position, and the locking clip prevents retraction of the male fitting from the connector head.

12 Claims, 16 Drawing Sheets

(56) References Cited

U.S. PATENT DOCUMENTS

| | | |
|---|---|---|
| 2020/0124218 A1 | 4/2020 | Dreux et al. |
| 2020/0355308 A1 | 11/2020 | Hunt et al. |
| 2022/0003347 A1* | 1/2022 | Barthel ............... F16L 37/0885 |
| 2022/0163153 A1* | 5/2022 | Gauthier |
| 2022/0299143 A1* | 9/2022 | Gabbey ................. F16L 37/144 |
| 2023/0049507 A1* | 2/2023 | Haglin .................. F16L 37/144 |
| 2023/0108924 A1* | 4/2023 | Teasley ............... F16L 37/1225 |

* cited by examiner

QUICK CONNECTOR WITH VERIFICATION

CROSS-REFERENCE TO RELATED APPLICATIONS

This application claims the benefit of U.S. Provisional Application 63/312,984, filed Feb. 23, 2022, the disclosure of which is incorporated by reference in its entirety.

FIELD OF THE INVENTION

The present invention relates to connector assemblies to join fluid lines together, and in particular, connector assemblies providing visual connection verification.

BACKGROUND OF THE INVENTION

Quick connectors are often used in the automotive industry to provide a fluid connection between two components. For example, VDA quick connectors (taking their name from the Germany Association of the Automotive Industry, or "VDA"), are commonly used for engine cooling circuits and for cooling the batteries of electric or hybrid vehicles. Known VDA quick connectors include a barbed tube at one end and a push-and-lock collar at the other end. The push-and-lock collar can include an internal retainer ring configured to be mounted around a male fitting. Once the retainer ring and the male fitting are inserted within the collar, a locking element such as a metallic clip or spring extends around the collar and prevents its withdrawal.

VDA quick connectors sometimes include a verification tab to provide visual verification that the male fitting is securely engaged within the quick connector. Once such quick connector is disclosed in US2020/0355308 entitled "Quick Connector Assembly with Verification Tab," the disclosure of which is incorporated by reference in its entirety. This quick connector includes a verification tab that is slideably displaced along a slot in the quick connector collar. When the male fitting is fully inserted into the open end of the collar, the verification tab moves from a negative verification position to a positive verification position, providing visual (optionally machine readable) confirmation of a secure connection.

Despite their advantages, there remains a continued need for an improved push-and-lock quick connector with visual confirmation of a secure connection. In particular, there remains a continued need for an improved VDA quick connector for providing versatility among a range of physical configurations, including straight connections and angled connections.

SUMMARY OF THE INVENTION

An improved quick connector is provided. The quick connector includes a connector body, a connector head, a verification tab, and a locking clip. The connector body can be coupled to the connector head at multiple rotational orientations, and the connector head includes a retainer ring integrally formed therein. The connector head further includes an axial slot for the verification tab and includes first and second tangential slots for the locking clip. Upon insertion of a male fitting (e.g., a VDA-type spigot) into the connector head, the verification tab is slideably displaced from a concealed position to a visible position, and the locking clip prevents retraction of the male fitting from the connector head.

In one embodiment, the connector head includes an outer sidewall connected to an inner sidewall by an annular shelf. The inner sidewall and the annular shelf are functionally a VDA retainer ring. The connector head includes a plurality of resilient latching arms at regular intervals about the circumference of the outer sidewall. The resilient latching arms are angled inwardly to engage locking tabs disposed about the connector body. The outer sidewall also includes a plurality of keyed recesses to allow insertion of the connector body into the connector head at a finite number of rotational orientations. The outer sidewall further includes a lower engagement aperture and an upper engagement aperture that connect to the axial slot, the engagement apertures being shaped to receive a ramped projection of the verification tab.

In this and other embodiments, the connector body includes a collar having a plurality of locking tabs. The collar also includes an alignment recess (or projection) that is keyed to an alignment projection (or recess) in the connector head. Optionally, the alignment recess is defined in the leading peripheral edge of the collar, and the alignment projection is formed in the annular shelf between the inner sidewall and the outer sidewall of the connector head. The connector body can include a wide variety of fittings, including an elbow fitting or a straight fitting. Further, the connector body can include a sensor port. When assembled, an O-ring is compressed between the collar of the connector body and the annular shelf of the connector head to provide a liquid-tight connection between the connector head and the connector body.

Embodiments of the invention provide a quick connector having a retainer ring that is integrally molded to the connector head. All other components of the quick connector are separate, including the connector body, the verification tab, the O-ring, and the locking clip. The connector body can be snap-fit into the connector head, using alignment projections as visual guides. The connector head can be used with a wide variety of connector bodies for a wide range of fluids (e.g., coolant, oil, fuel), simplifying tooling and assembly of the quick connector. For example, the connector head can be joined to an elbow connector body, a straight connector body, or a connector body having a sensor port, without requiring a change in tooling or assembly of the connector head, verification tab, or locking clip.

These and other features and advantages of the present invention will become apparent from the accompanying description of the invention, when viewed in accordance with the accompanying drawings and appended claims.

DETAILED DESCRIPTION OF THE CURRENT EMBODIMENT

Figure 1:
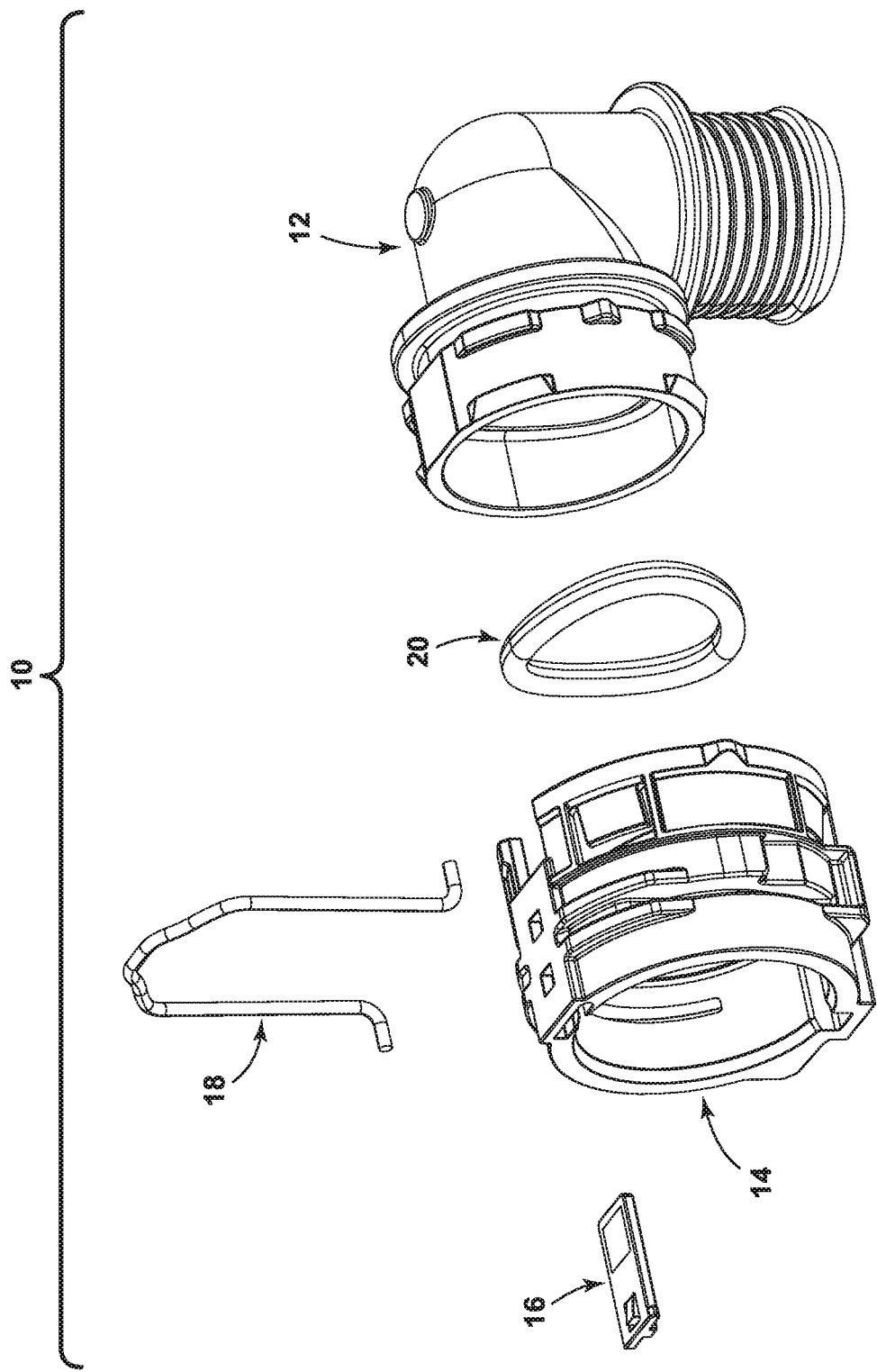
FIG. 1 is an exploded view of a quick connector in accordance with one embodiment of the present invention.

Referring to FIG. 1, a quick connector in accordance with an embodiment of the present invention is illustrated and designated 10. The quick connector 10 includes a connector body 12, a connector head 14, a verification tab 16, and a locking clip 18. An O-ring 20 provides a seal between the connector body 12 and the connector head 14. Each such feature of the quick connector 10 is described below. Though primarily described in connection with coolants lines, the quick connector 10 can be used in a wide variety of other applications as desired, including the connection of brake lines and fuel lines, by non-limiting example.

Figure 2:
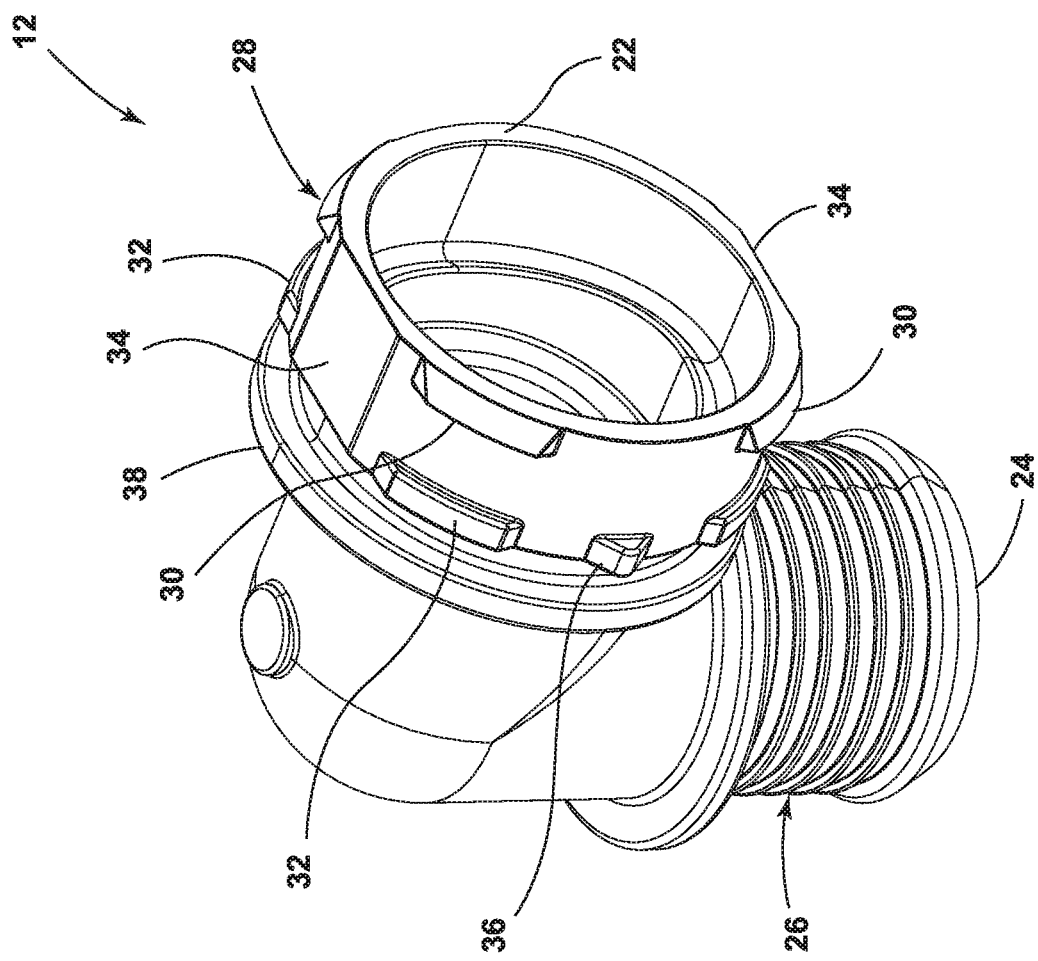
FIG. 2 is a first perspective view of the connector body of FIG. 1.
Figure 3:
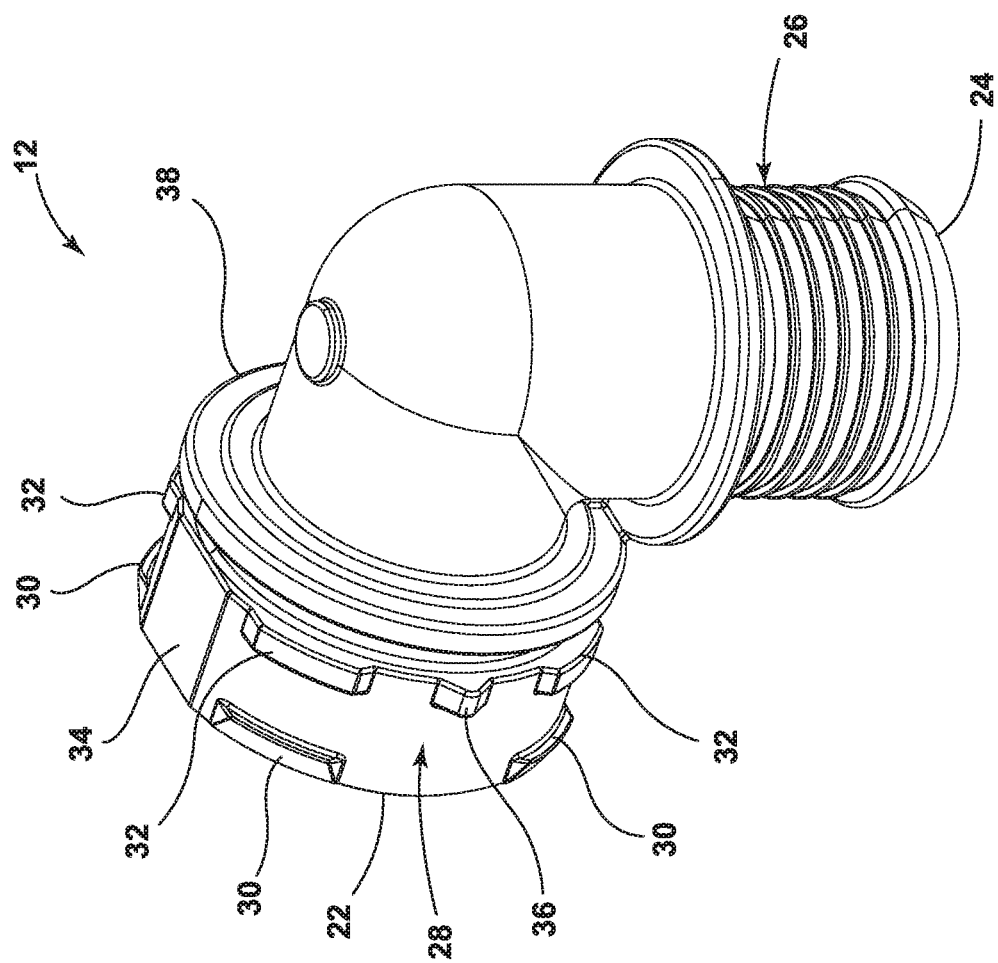
FIG. 3 is a second perspective view of the connector body of FIG. 1.

As shown in FIGS. 2 and 3, the connector body 12 defines a fluid passage between an input end 22 and an output end 24. The terms "input end" and "output end" are recited for clarity and are not intended to be limiting, as the moving fluid (e.g., coolant, oil, fuel) may move in the opposite direction in some applications. The connector body 12 comprises an angled coupling in the illustrated embodiment, for example an elbow fitting, such that the fluid passage includes an approximately 90-degree bend between the input end 22 and the output end 24. In other embodiments, the angled coupling can be 30-degrees, 45-degrees or 60-degrees for example. In still other embodiments, the connector body 12 can comprise a straight coupling.

As also shown in FIGS. 2 and 3, the connector body 12 includes a barbed stem 26 at the output end 24 and a collar 28 at the input end 22. The collar 28 includes a cylindrical sidewall having an outer diameter that corresponds to the inner diameter of the connector head 14, such that the collar 28 can be received within the connector head 14. In addition, the collar 28 includes a plurality of locking tabs 30 at regular intervals along the exterior radial surface of the collar 28. Four locking tabs 30 are disposed at 90-degree intervals in the illustrated embodiment, however greater or fewer number of locking tabs 30 can be included in other embodiments (for example, three locking tabs at 120-degree intervals, or six locking tabs at 60-degree intervals). The locking tabs 30 include a ramped surface, opposite of an engagement surface, to facilitate easy insertion of the collar 28 into the connector head 14.

As shown, the locking tabs 30 are adjacent the leading edge of the collar 28. For each locking tab 30, the collar 28 includes a circumferential rib 32 that is axially offset from the locking tab 30. The circumferential rib 32 and the locking tab 30 have approximately the same width in the tangential direction. Between adjacent circumferential ribs 32, the collar 28 includes a flat side surface 34 or an alignment projection 36. The flat side surfaces 34 provide a sliding surface for the verification tab 16, with two flat side surface 34 being shown in FIGS. 2 and 3. The alignment projection 36 is a triangular-shaped projection in the illustrated embodiment and is functionally a poka-yoke feature to facilitate error-free attachment to the connector head 14, discussed below. In the illustrated embodiment, the alignment projections 36 are positioned at 3-o'clock and at 9-o'clock on the collar 28, and the flat side surfaces 34 are positioned at 12-o'clock and at 6-o'clock on the collar 28. A circumferential flange 38 separates the collar 28 from the remainder of the connector body 12, which as noted above can include a wide variety of configurations, including the illustrated elbow fitting, by non-limiting example.

Figure 4:
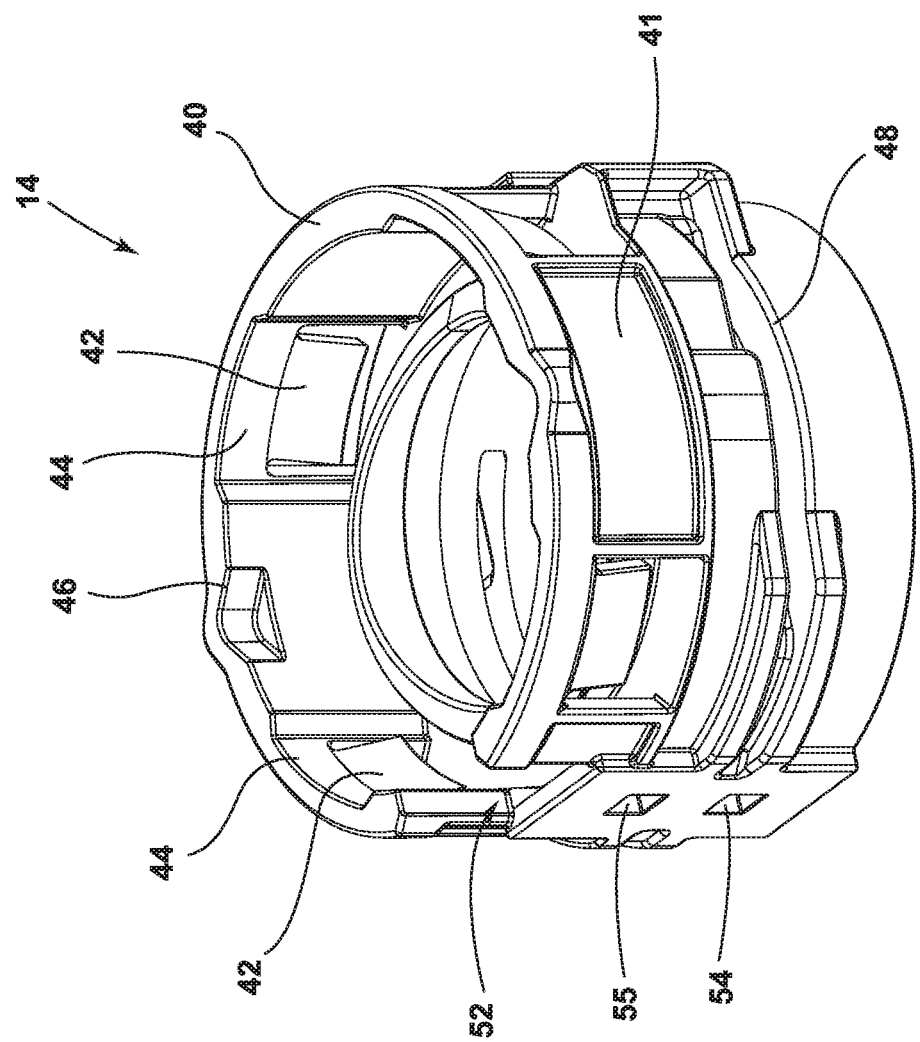
FIG. 4 is a perspective view of the connector head of FIG. 1.

As shown in FIG. 4, the connector head 14 includes an outer sidewall 40 having an inner diameter approximately equal to the outer dimeter of the collar 28 of the connector body 12. The connector head 14 is configured for locking attachment to the connector body 12 at one of a finite number of rotational orientations (two as shown in the illustrated embodiment). In particular, the connector head 14 includes four latching arms 42 that extend radially inward from the outer sidewall 40 and which engage the collar locking tabs 30. The latching arms 42 are resiliently deformable in the radial direction, such that the ramped surface of each locking tab 30 flexes the latching arms 42 upon insertion of the collar 28 into the connector head 14. Once the collar 28 is fully inserted into the connector head 14, the flat engagement surface of each locking tab 30 prevents removal of the connector head 14. As also shown in FIG. 4, the interior surface of the cylindrical sidewall includes an axial recess 44 in alignment with each latching arm 42 for receiving the circumferential ribs 32 therein.

As also shown in FIG. 4, the connector head 14 includes keyed recesses 46 for the collar alignment projections 36. The keyed recesses 46 allow insertion of the collar 28 into the connector head 14 in only a finite number of rotational configurations (two, in the illustrated embodiment). The outer sidewall 40 protrudes radially outward at each recess 46, thereby providing the operator with a tactile guide for insertion onto the collar 28 of the connector body 12. Like the alignment projections 36, the keyed recesses 46 are triangle-shaped, however other shapes are possible, provided that the keyed recesses 46 include a complimentary shape with respect to the alignment projections 36. As also shown, the outer sidewall 40 is cylindrical and defines a first tangential slot 48 opposite of a second tangential slot 50 for the locking clip 18. Each such slot 48, 50 is orthogonal to the lengthwise axis of the connector head 14 and extends entirely through the thickness of the sidewall, thereby allowing the locking clip 18 (which extends around the outside of the connector head 14) to establish a lockable engagement with a male fitting (which is received inside the connector head 14).

Figure 5:
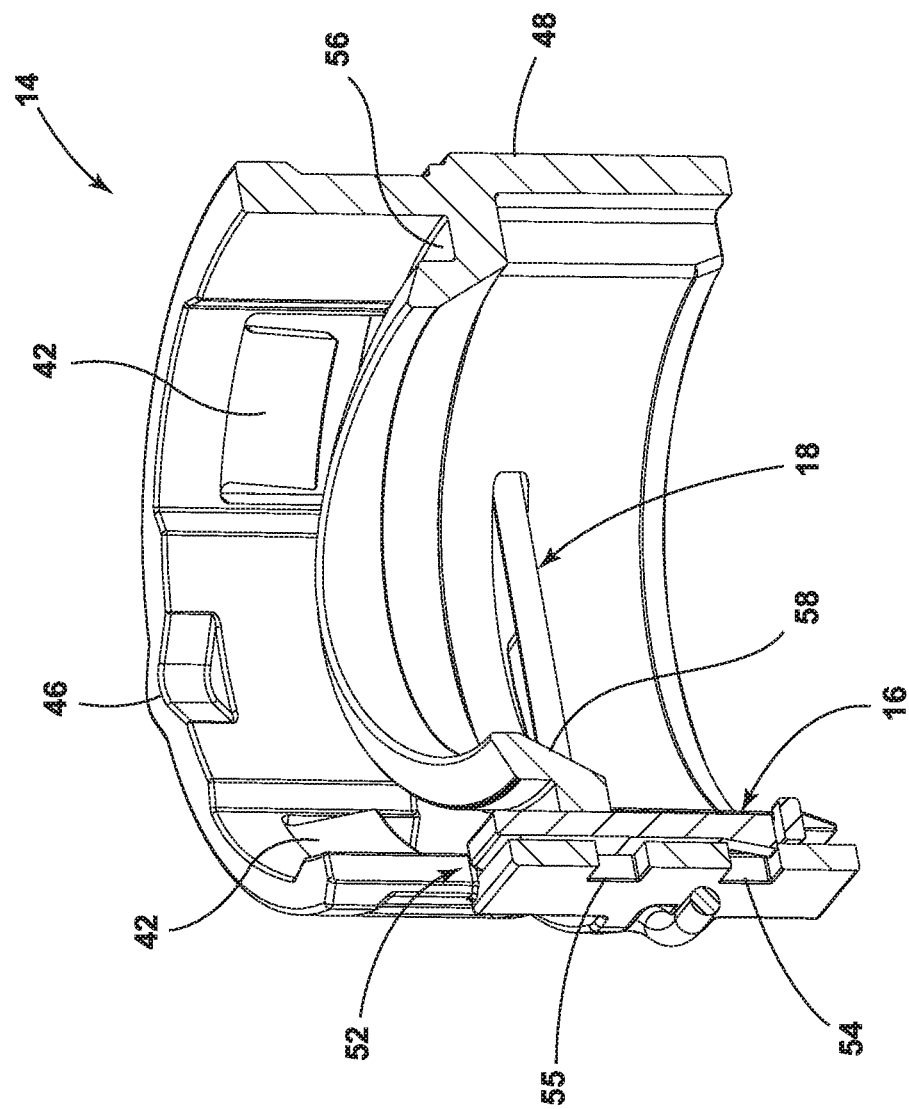
FIG. 5 is a cross-sectional view of the connector head of FIG. 1.
Figure 6:
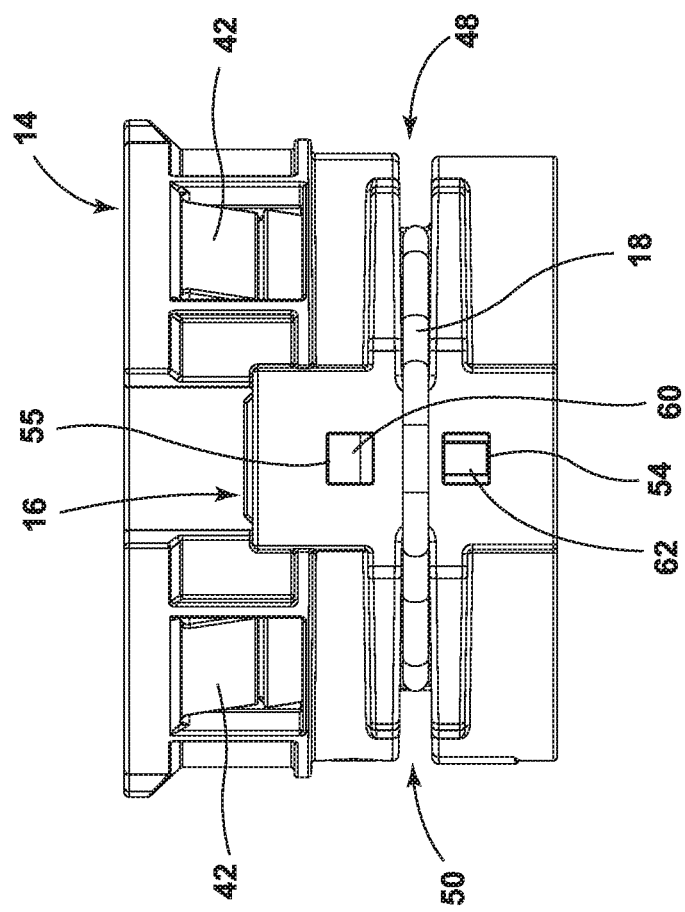
FIG. 6 is a side elevation view of the connector head of FIG. 1.

As best shown in FIGS. 5 and 6, the verification tab 16 is received within an axial slot 52 in the connector head sidewall 40. The axial slot 52 is defined within the sidewall 48 and extends entirely therethrough in the axial direction. The axial slot 52 is generally rectangular to house the verification tab 16 therein. The connector head sidewall 40 includes two engagement apertures 54, 55, axially offset from each other, for securing the verification tab 16 in one of two positions: a negative verification position (in which the verification tab 16 is concealed from view), and a positive verification position (in which a portion of the verification tab 16 having a verification indicia 60 is visible). The engagement apertures 54, 55 are illustrated as rectangular through-holes in the illustrated embodiment, but can include other shapes in other embodiments. As also shown in cross-section in FIG. 5, the interior of the connector head 14 includes annular shelf 56 for the O-ring 20. The annular shelf 56 is bordered by an inner sidewall 58, which is functionally a retainer ring that has been integrally molded to the connector head 14. The inner sidewall 58 is sized to receive the appropriate male fitting (e.g., VDA and SAE spigots). When the quick connector 10 is assembled, the O-ring 20 is sandwiched between the collar 28 and the annular shelf 56 to provide a fluid-tight connection between the connector body 12 and the connector head 14.

Figure 7:
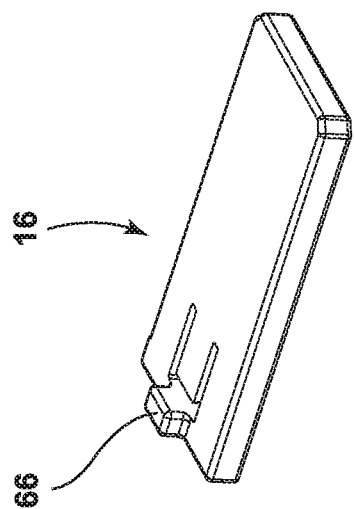
FIG. 7 are views of a verification tab for the quick connector of FIG. 1.
Figure 7:
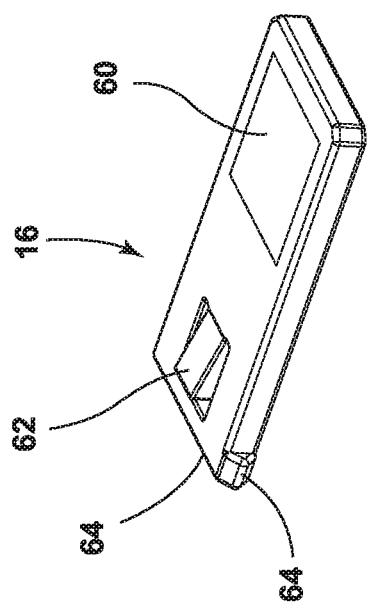

The verification tab 16 in accordance with one embodiment is shown in FIG. 7. The verification tab 16 is shaped to be received within the axial slot 52 in the connector head 14 and includes a verification indicia 60. The verification indicia 60 can include for example a one-dimensional barcode (e.g. UPC code, EAN code, code 39, code 128, ITF, code 93, codabar, GS1 databar, MSI Plessey, etc.), a two-dimensional barcode (e.g. QR code, datamatrix code, PDF417, AZTEC, etc.), a holographic code, a human-readable alpha-numeric code, or other codes, whether known or hereinafter developed, that are interpretable by machine or human. In other embodiments the verification indicia 60 is not machine readable and includes a color, a pattern, a logo, or other feature. The verification tab 16 also includes a locking member 62. The locking member 62 is illustrated as a ramped projection, but can include other configurations in other embodiments, for example a nub or a barb. The locking member 62 is sized to be received within the lower engagement aperture 54 in the negative verification position and the upper engagement aperture 55 in the positive verification position. Opposite of the locking member 62, the verification tab 16 includes a rectangular projection 66 which directly engages the male fitting as discussed below. The verification tab 16 further includes a side projection 68 along a side surface thereof to limit travel of the verification tab 16 in the axial slot 52. The side projection 68 also offers a poka-yoke feature during assembly into the axial slot 52 enabling the operator to properly insert the verifier tab 16 in the right orientation.

Figure 8:
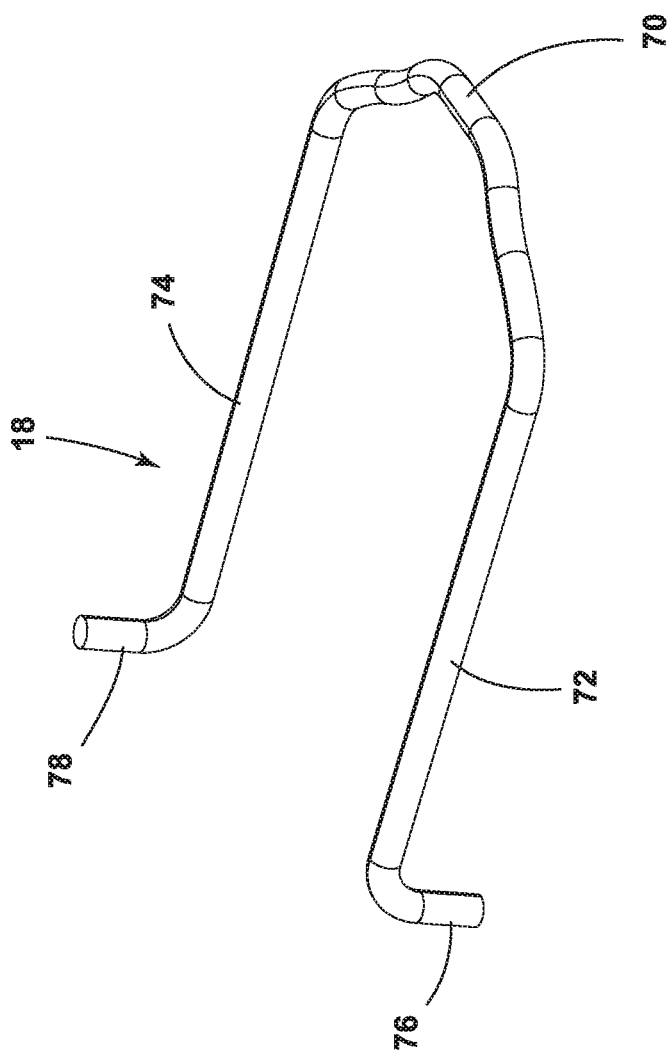
FIG. 8 is a perspective view of the locking clip of FIG. 1.

The locking clip 18 in accordance with one embodiment is shown in FIG. 8. The locking clip 18 is generally U-shaped, being formed from metal, and having base portion 70 and first and second leg portions 72, 74. The leg portions 72, 74 are received within the tangential slots 48, 50 in the connector head 14 (generally shown in FIG. 6). The locking clip 18 includes first and second tangs 76, 78 to prevent removal from the connector head 14. When a male fitting (for example a VDA-type spigot) is inserted into the connector head 14, the leg portions 72, 74 expand radially outward around a raised annular bead of the male fitting, and the leg portions 72, 74 spring back to rest behind the raised annular bead. Simultaneously, the male fitting abuts the rectangular projection 66 of the verification tab 16 to move the verification tab 16 from the negative verification position to the positive verification position.

Figure 9:
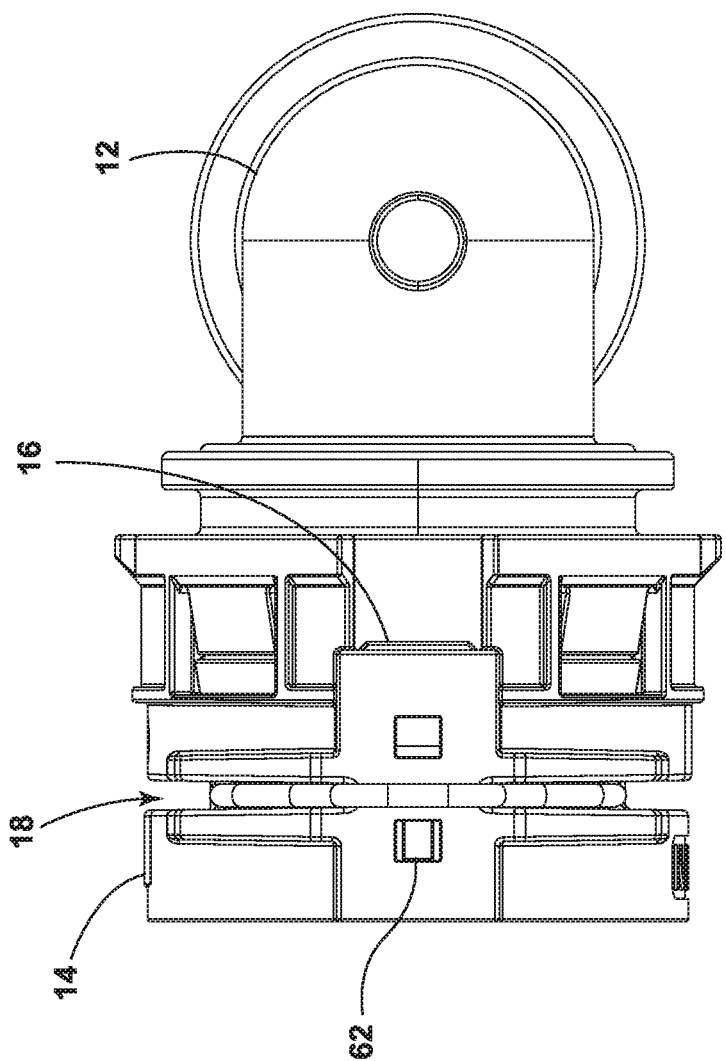
FIG. 9 illustrates a verification tab in the negative verification position.
Figure 10:
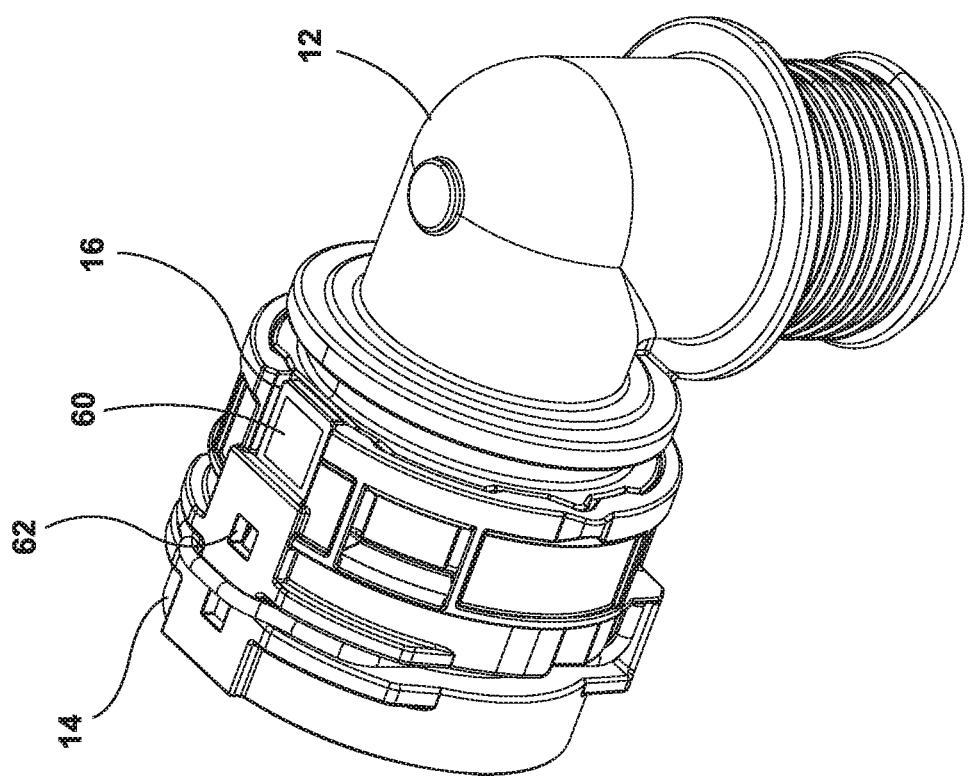
FIG. 10 illustrates a verification tab in the positive verification position.

As shown in FIG. 9, for example, the verification tab 16 is illustrated in the negative verification position. In this position, the locking member 62 is received within the lower engagement aperture 54. Upon insertion of a male fitting into the connector head 14, the male fitting bears against the verification tab 16, and in particular, rectangular projection 66, causing the verification tab 16 to move to the positive verification position. In this positive verification, shown in FIG. 10, the verification indicia 60 is visible above the axial slot 52. The locking member 62 is received within the upper engagement aperture 55, and the side projection 68 prevents further movement of the verification tab 16 in the axial direction.

Figure 13:
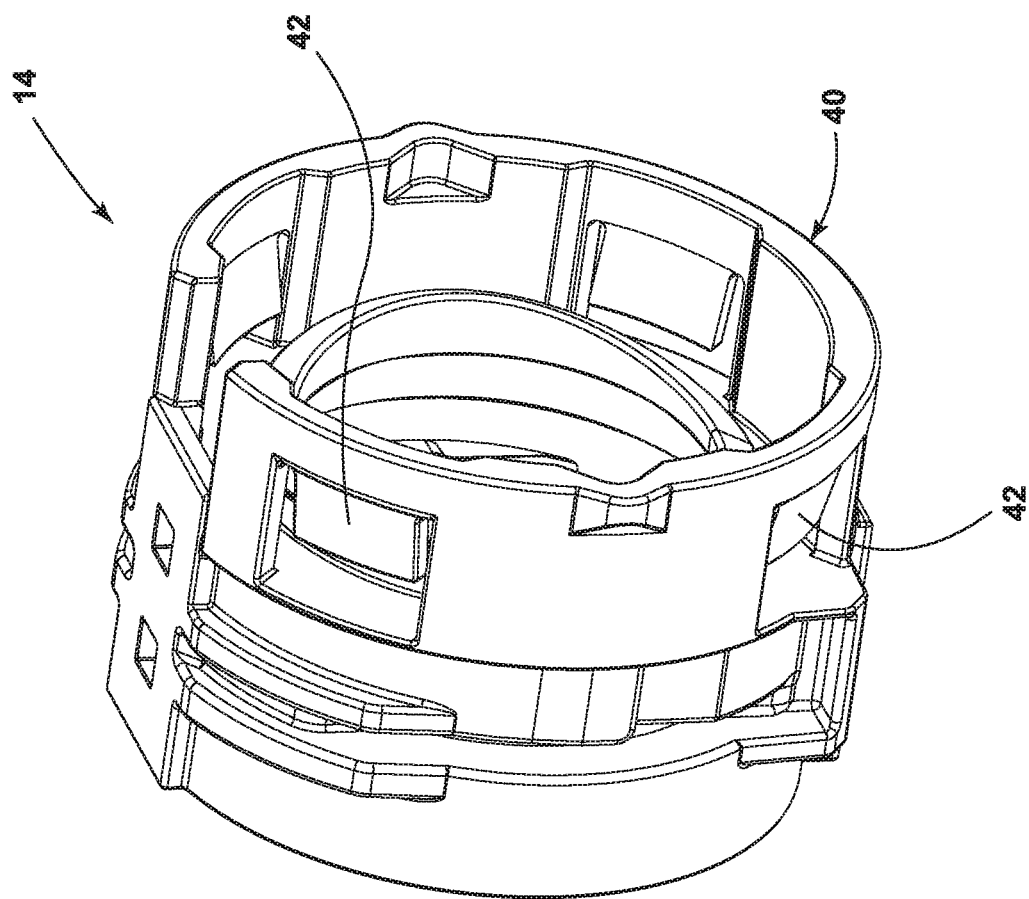
FIG. 13 illustrates a connector head including an alternative construction.

In the embodiments discussed above, the outer sidewall 40 of the connector head 14 includes a framed-out recess 41 between adjacent locking arms 42 (e.g., see FIG. 4). In the alternative embodiment of FIG. 13, however, the framed-out recess is omitted from the outer sidewall 40 of the connector head 14, which simplifies tooling of the connector head 14.

Figure 14:
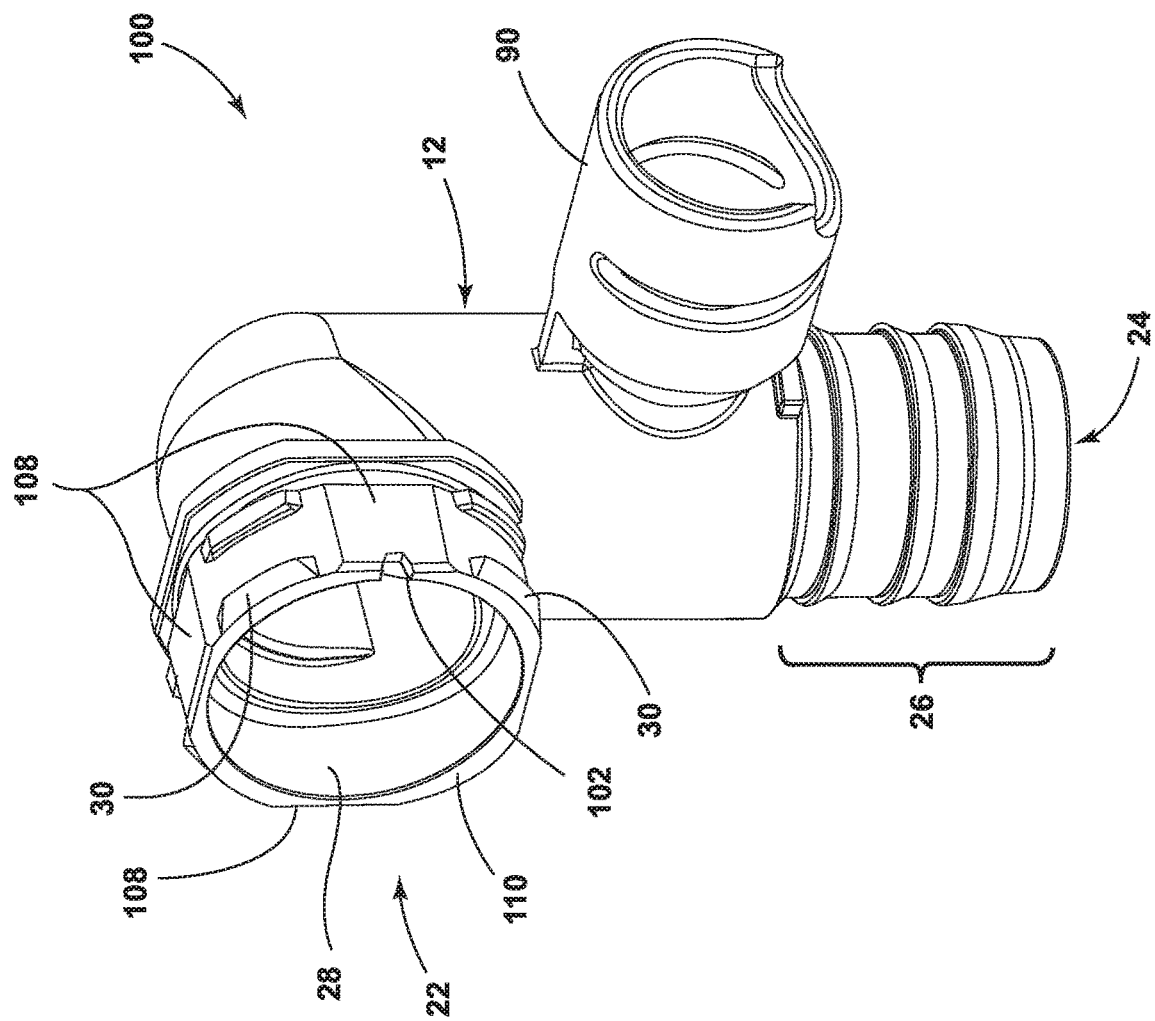
FIG. 14 illustrates a connector body including an alternative construction.
Figure 15:
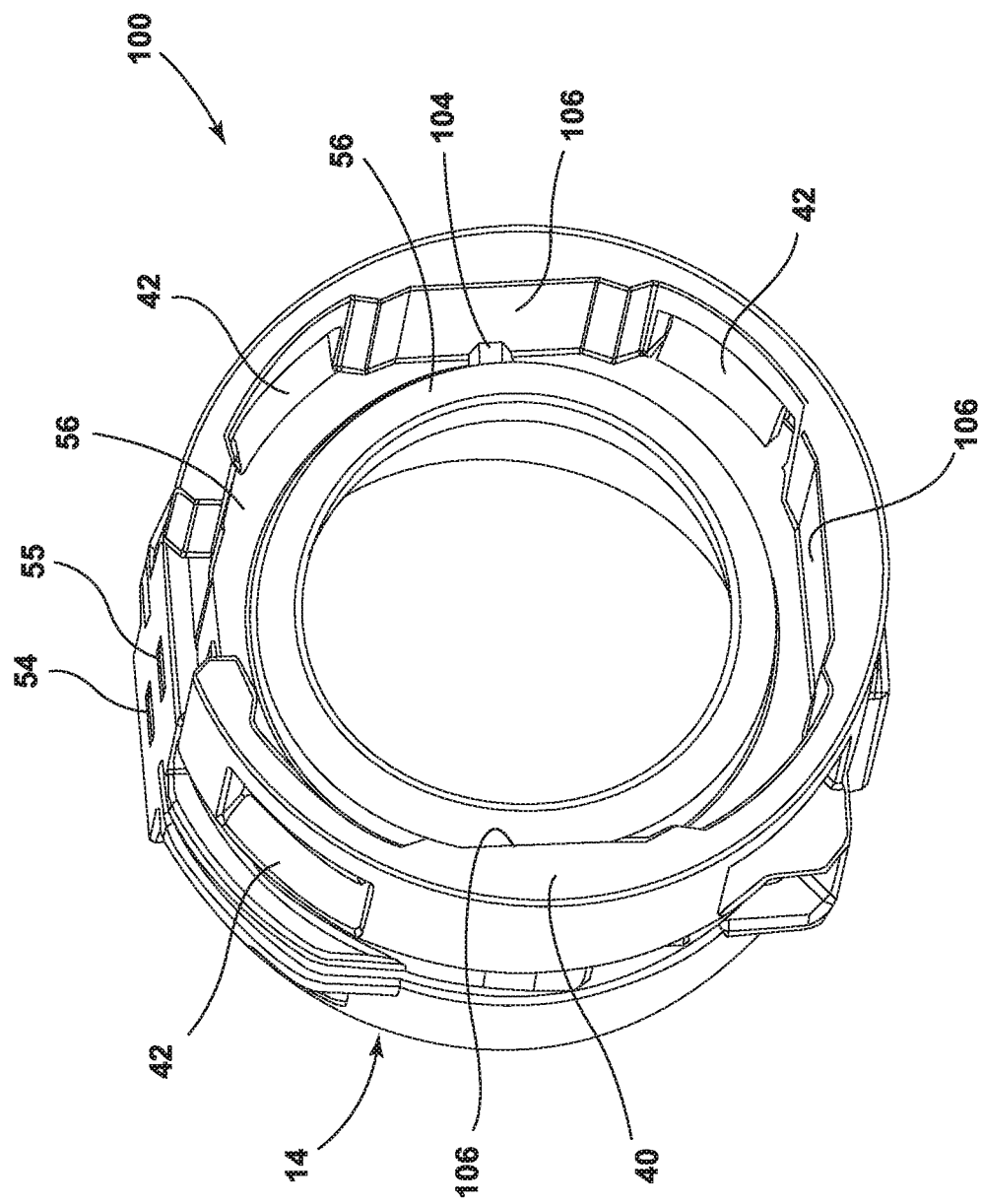
FIG. 15 illustrates a connector head for use with the connector body of FIG. 14.
Figure 16:
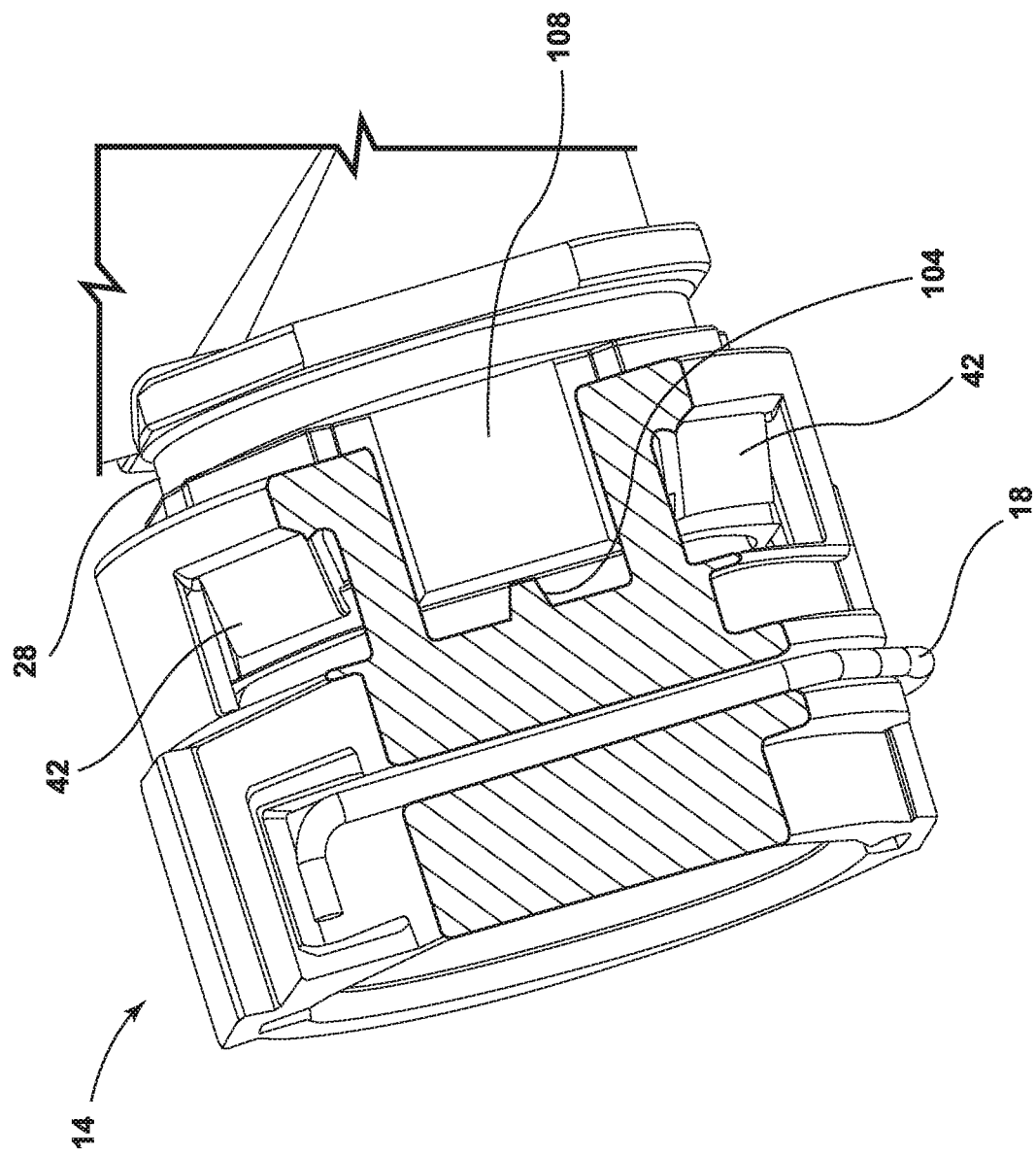
FIG. 16 illustrates a partial cross-section of the connector head of FIG. 15.

Referring now to FIGS. 14-16, a quick connector in accordance with another embodiment of the present invention is illustrated and designate 100. The quick connector 100 of FIGS. 14-16 is similar in structure and in function to the quick connector 10 of FIGS. 1-12, except that the connector body 12 (shown in FIG. 14) includes an alignment notch 102 corresponding to an alignment projection 104 on the connector head 14 (shown in FIG. 15), ensuring that the connector head 14 can be installed onto the connector body 12 in a finite number of rotational configurations (for example one rotational configuration in the illustrated embodiment). This configuration can be reversed in other embodiments, such that the alignment notch is defined in the connector head 14 and the alignment projection is defined in the connector body 12. In still other embodiments, each of the connector body 12 and the connector head 14 include an alignment notch and an alignment projection.

As shown in FIG. 14, the connector body 12 defines a fluid passage between an input end 22 and an output end 24. The connector body 12 comprises an angled coupling in the illustrated embodiment, for example an elbow fitting, such that the fluid passage includes an approximately 90-degree bend between the input end 22 and the output end 24. The connector body 12 can comprise essentially any configuration, including elbow fittings, straight fittings, and/or fittings having sensor ports 90, by non-limiting example. The connector body 12 includes a barbed stem 26 at the output end 24 and a collar 28 at the input end 22. The collar 28 includes a cylindrical sidewall having an outer diameter that corresponds to the inner diameter of the connector head 14, such that the collar 28 can be received within the connector head 14. In addition, the collar 28 includes a plurality of locking tabs 30 at regular intervals along the exterior radial surface of the collar 28. Four locking tabs 30 are disposed at 90-degree intervals in the illustrated embodiment, however greater or fewer number of locking tabs 30 can be included in other embodiments.

Turning now to FIG. 15, the connector head 14 includes an outer sidewall 40 having an inner diameter approximately equal to the outer dimeter of the collar 28. The connector head 14 is configured for locking attachment to the connector body 12 at one of a finite number of rotational orientations. The connector head 14 includes four latching arms 42 that extend radially inward from the outer sidewall 40 and which engage the collar locking tabs 30. The latching arms 42 are resiliently deformable in the radial direction, such that the ramped surface of each locking tab 30 flexes the latching arms 42 upon insertion of the collar 28 into the connector head 14. Once the collar 28 is fully inserted into the connector head 14, the flat engagement surface of each locking tab 30 prevents removal of the connector head 14. The connector head 14 according to this embodiment lacks the O-ring 20 found in FIG. 1.

As shown in FIG. 15, the annular shelf 56 of the connector head 14 includes a projection 104 in alignment with a notch 102 in the input end 22 of the connector body 12. The projection 104 interconnects the inner sidewall 56 and the outer sidewall 40, being positioned between two of latching arms 42. The notch 102 allows insertion of the collar 28 into the connector head 14 in only a finite number of rotational configurations (one, in the illustrated embodiment). As shown in FIG. 14, for example, the alignment notch 102 is defined in the leading peripheral edge 110 of the input end 22 of the connector body 12, which is otherwise uninterrupted about its circumference. The alignment notch 102 is depicted at the 3 o'clock position in FIG. 14, however the alignment notch 102 (or two or more alignment notches) can be positioned at other locations of the collar 28. The alignment notch 102 ensures that the connector head 14 is seated onto the connector body 12 in the correct orientation. As shown in FIG. 16, for example, the alignment projection 104 will physically abut the leading peripheral edge 110 of the collar 28, preventing the latch arms 42 of the connector head 14 from engaging the locking tabs 30 of the connector body 12. As a result, a mis-assembly of the quick connector 100 is prevented.

As also shown in FIGS. 14-16, the connector head 14 and the connector body 12 include mutually opposing flat sliding surfaces 106, 108, respectively. With respect to the connector head 14, the inner radial surface of the outer sidewall 40 includes three flat sliding surfaces 106 spaced at ninety-degree intervals about the inner circumference of the connector head 14, the intermediate sliding surface 106 being opposite of the axial slot for the verification tab 16. With respect to the connector body 12, the outer radial surface of the collar 28 includes four flat sliding surfaces 108 spaced at ninety-degree intervals about the outer circumference of the collar 28. The mutually opposing flat sliding surface 106, 108 permit the connector body 12 to easily slide into the connector head 14 in a finite number of rotational positions. For example, four rotational positions are available in the illustrated embodiment. As also shown, the connector body 12 includes four sliding surfaces 108 while the connector head 14 includes three sliding surfaces 106. The alignment notch 102 extends partially into one of the four flat sliding surfaces 108 of the collar 28. Once seated in the connector head 14, the connector body 12 is prevented from rotating by operation of the mutually opposing flat sliding surface 106, 108. In such a manner, the mutually opposing sliding surfaces 106, 08 facilitate assembly of the connector head 14 onto the connector body 12 in a finite number of rotational positions according to pre-defined assembly requirements. For example, if assembly instructions require the connector head 14 to be assembled onto the connector body 12 in the 90-degree position (shown in FIG. 14), the sliding surfaces 106, 108 and the notch 102 will aid the operator in assembling the connector head 14 in good manner while avoiding assembly mistakes.

Figure 11:
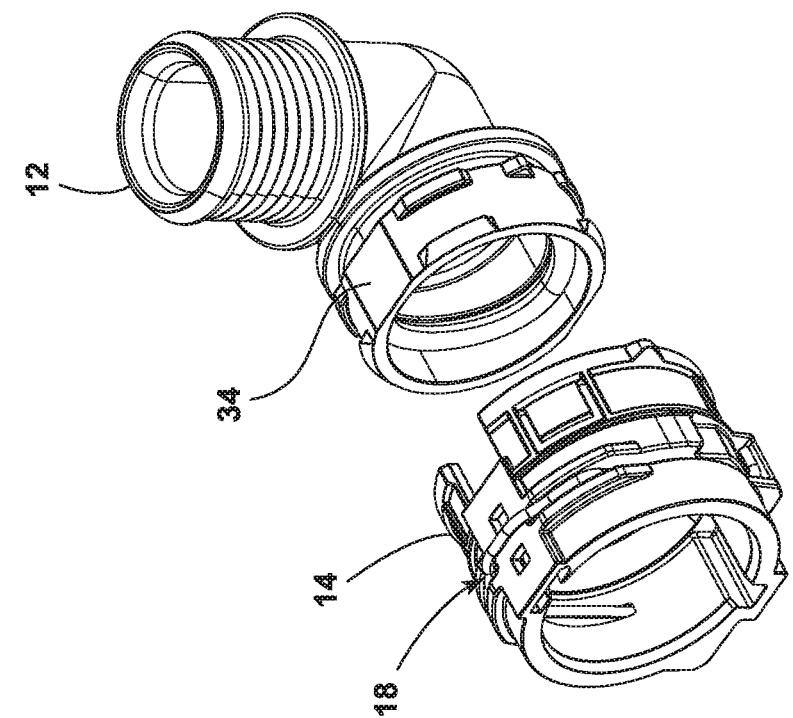
FIG. 11 illustrates the connector body in multiple rotational configurations.
Figure 11:
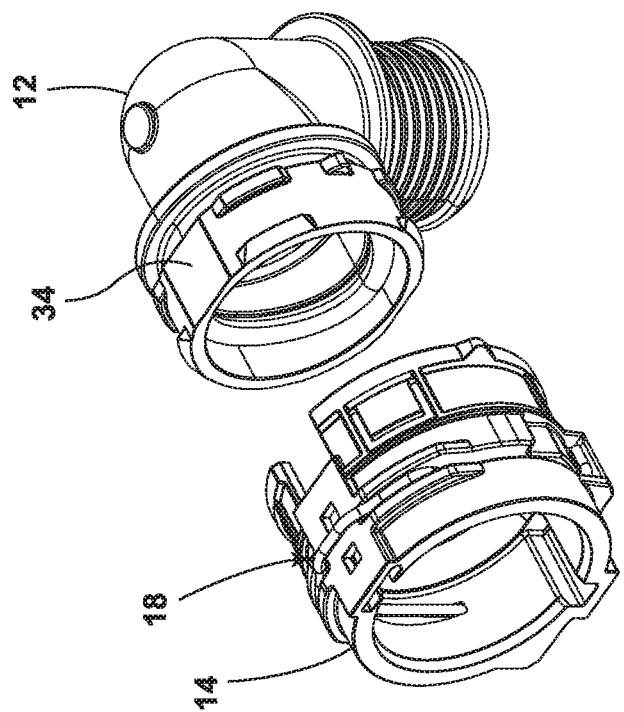
Figure 12:
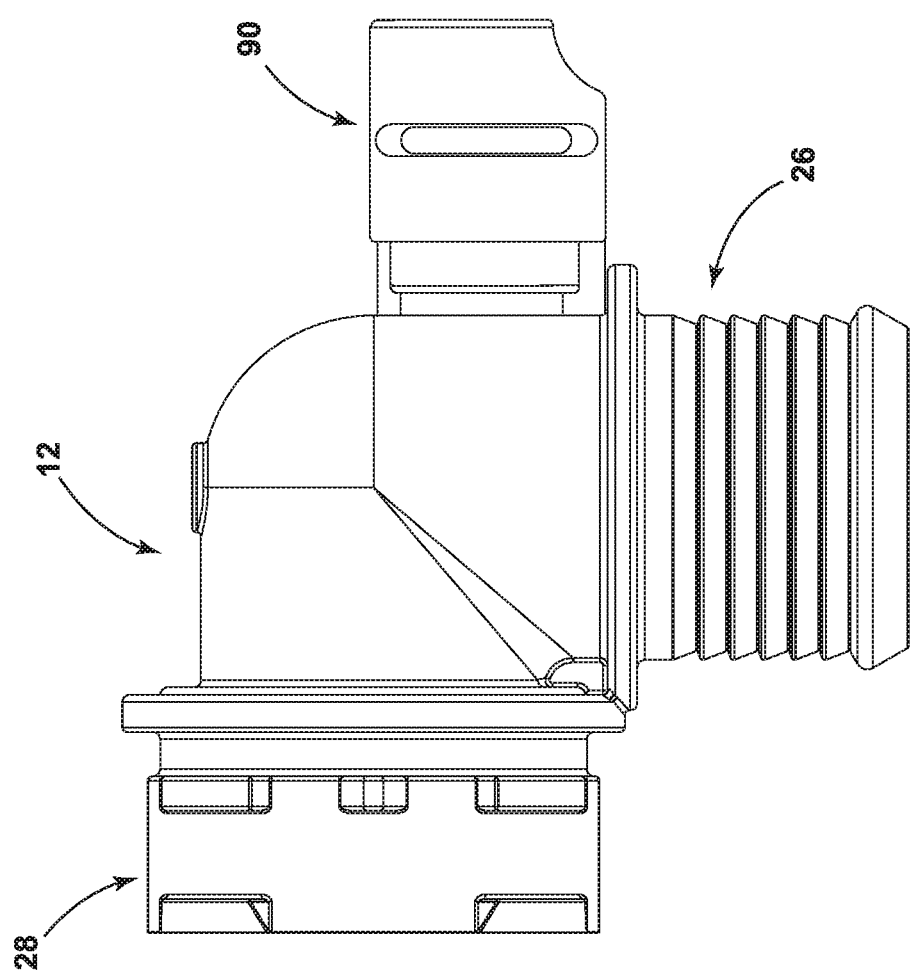
FIG. 12 illustrates a connector body including a sensor port.

To reiterate, the embodiments discussed above include a quick connector 10, 100 having a retainer ring that is integrally molded to the connector head 14. All other components of the quick connector 10, 100 are separate, including the connector body 12, the verification tab 16, the locking clip 18, and the O-ring 20. The connector body 12 and the connector head 14 can be formed from any suitable material, optionally a durable, chemical-resistant and lightweight polymerized material. The verification tab 16 can be shipped in the negative verification position as shown in FIG. 9. The connector body 12 can be snap-fit into the connector head 14, using the flat side surfaces 34 and the alignment projections 36 as visual guides. The connector body 12 cannot be assembled onto the connector head 14 unless the alignment projections 36 are aligned with the corresponding recesses 46 it the connector head 14. Consequently, each connector body 12 can be joined to the connector head 14 in one of two orientations, as illustrated in FIG. 11 by non-limiting example. The connector body 12 makes tooling and assembly easier, as the connector head 14 can be used with a wide variety of connector bodies 12. For example, the connector head 14 can be joined to a connector body 12 having a sensor port 90, as shown in FIGS. 12 and 14, without requiring a change in tooling or assembly of the connector head 14, verification tab 16, and locking clip 18. As noted above, the connector body 12 can comprise essentially any configuration, including elbow fittings, straight fittings, and fittings having sensor ports, by non-limiting example.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements by ordinal terms, for example "first," "second," and "third," are used for clarity, and are not to be construed as limiting the order in which the claim elements appear. Any reference to claim elements in the singular, for example, using the articles "a," "an," "the" or "said," is not to be construed as limiting the element to the singular.

The invention claimed is:

1. A quick connector comprising:
   a connector body defining a fluid passage between a first end portion and a second end portion, the connector body including an exterior surface defining a plurality of planar sliding surfaces and a plurality of locking tabs;
   a connector head adapted to be coupled to the connector body during pre-assembly of the quick connector, the connector head including a plurality of latching arms, the plurality of latching arms being configured to engage the plurality of locking tabs, such the connector head can be coupled to the connector body at a plurality of rotational orientations as a pre-assembled quick connector;
   a locking clip extending around the connector head and including first and second leg portions that are received within first and second tangential slots in the connector head; and
   a verification tab disposed within an axial slot in the connector head, wherein, upon insertion of a male fitting within the pre-assembled quick connector, the verification tab is slideably displaced in an axial direction along one of the plurality of planar sliding surfaces of the connector body from a concealed position to a visible position.

2. The quick connector of claim 1, wherein the connector body includes a collar, and wherein the plurality of locking tabs are disposed at spaced apart intervals about an outer radial surface of the collar.

3. The quick connector of claim 1, wherein the plurality of latching arms are disposed at spaced apart intervals about an inner radial surface of the connector head.

4. The quick connector of claim 1, wherein the connector body includes a collar defining an alignment notch therein, and wherein the connector head includes an alignment projection shaped for insertion into to the alignment notch.

5. The quick connector of claim 4, wherein the connector head includes an outer sidewall spaced apart from an inner sidewall by an annular shelf, wherein the alignment projection is between the inner sidewall and the outer sidewall.

6. The quick connector of claim 4, wherein the alignment notch is defined in a leading peripheral edge of the collar.

7. The quick connector of claim 1, wherein the connector head is configured for locking attachment to the connector body at a finite number of rotational orientations.

8. The quick connector of claim 1, wherein the plurality of locking tabs are adapted to removably engage the plurality of latching arms in the connector head.

9. The quick connector of claim 1, wherein the verification tab includes a machine-readable visible indicia, the visible indicia including a QR code or a bar code.

10. The quick connector of claim 1, wherein the verification tab includes a ramped projection that is received within an engagement aperture defined in an outer sidewall of the connector head.

11. The quick connector of claim 10, wherein the connector head further defines a lower engagement aperture and an upper engagement aperture in the outer sidewall of the connector head.

12. The quick connector of claim 1, wherein one of the plurality of planar sliding surfaces is rearwardly adjacent the verification tab when the verification tab is in the visible position.

* * * * *